US 8,955,821 B2

(12) United States Patent
Okuda et al.

(10) Patent No.: US 8,955,821 B2
(45) Date of Patent: Feb. 17, 2015

(54) POSITIONER

(75) Inventors: Kouji Okuda, Tokyo (JP); Takashi Nomiyama, Tokyo (JP)

(73) Assignee: Azbil Corporation, Tokyo (JP)

( * ) Notice: Subject to any disclaimer, the term of this patent is extended or adjusted under 35 U.S.C. 154(b) by 341 days.

(21) Appl. No.: 13/429,731

(22) Filed: Mar. 26, 2012

(65) Prior Publication Data

US 2012/0248356 A1    Oct. 4, 2012

(30) Foreign Application Priority Data

Mar. 30, 2011    (JP) ................. 2011-075064

(51) Int. Cl.
*F16K 31/02* (2006.01)
*F16K 31/12* (2006.01)
*F15B 19/00* (2006.01)
*F16K 37/00* (2006.01)

(52) U.S. Cl.
CPC .............. *F16K 31/12* (2013.01); *F15B 19/005* (2013.01); *F16K 37/0025* (2013.01)
USPC .............. 251/129.04; 251/30.02; 251/129.01; 700/282

(58) Field of Classification Search
USPC ................. 137/486, 487.5; 251/30.01, 30.02, 251/129.04; 318/560; 327/3; 700/282, 287; 323/265
See application file for complete search history.

(56) References Cited

U.S. PATENT DOCUMENTS

| | | | | |
|---|---|---|---|---|
| 5,109,692 A * | 5/1992 | Fitzgerald | .................... | 73/168 |
| 5,431,182 A * | 7/1995 | Brown | .................... | 137/85 |
| 6,519,508 B1 * | 2/2003 | Saito | .................... | 700/282 |
| 8,159,092 B2 * | 4/2012 | Luthi et al. | .................... | 307/130 |
| 8,196,595 B2 * | 6/2012 | Chester et al. | .................... | 137/1 |
| 8,570,007 B2 * | 10/2013 | Schiff et al. | .................... | 323/271 |
| 2004/0035180 A1 * | 2/2004 | Okuda et al. | .................... | 73/8 |
| 2009/0248213 A1 * | 10/2009 | Gotoh | .................... | 700/282 |
| 2009/0302249 A1 * | 12/2009 | Fincher | .................... | 251/129.04 |

FOREIGN PATENT DOCUMENTS

| | | |
|---|---|---|
| JP | 62-28118 U | 2/1987 |
| JP | 2001-221201 A | 8/2001 |
| JP | 2004-151941 A | 5/2004 |
| JP | 2004-523016 A | 7/2004 |
| JP | 2010-140302 A | 6/2010 |

* cited by examiner

*Primary Examiner* — Matthew W Jellett
(74) *Attorney, Agent, or Firm* — Troutman Sanders LLP

(57) ABSTRACT

A power supply controlling function is provided in a controlling portion. The power supply controlling function defines a first pressure sensor, a second pressure sensor, a third pressure sensor, and an oscillation detecting sensor as sensors to which power may be supplied, and turns switches that are provided in the supply circuits of the power supply to the individual sensors to which power may be supplied ON and OFF so that a plurality of these sensors to which power may be supplied does not operate simultaneously.

3 Claims, 9 Drawing Sheets

POSITIONER

CROSS REFERENCE TO RELATED APPLICATIONS

The present application claims priority under 35 U.S.C. §119 to Japanese Patent Application No. 2011-075064, filed Mar. 30, 2011, which is incorporated herein by reference.

FIELD OF TECHNOLOGY

The present invention relates to a field device, such as a positioner for receiving the supply of an electric current through a pair of electric wires from a higher-level system, and for controlling the degree of opening of a regulator valve in accordance with the value of the supply electric current.

BACKGROUND

Conventionally, positioners have been provided in regulator valves, where the degree of opening of the regulator valve is controlled by the positioner. This positioner comprises a controlling portion that calculates a difference between a valve opening setting value that is sent from the higher-level device and an actual opening value that is fed back from the regulator valve, and outputs, as a control output, an electric signal that is produced through performing a specific calculation on this difference, an electro-pneumatic converting device (EPM) that converts into an air pressure signal the control output from the controlling portion, a pilot relay for amplifying the air pressure signal, converted by the electro-pneumatic converting device, and outputting it to a driving portion for the regulator valve, and an opening sensor for detecting the degree of valve opening of the regulator valve and sending it as the actual opening value to the controlling portion (See, for example, Japanese Unexamined Utility Model Registration Application Publication S62-28118).

Conventionally positioners are designed so as to operate with an electric current between 4 and 20 mA sent through a pair of electric wires from a higher-level system. For example, if a current of 4 mA is sent from the higher-level system, the opening of the regulator valve is set to 0%, and if a current of 20 mA is sent, then the opening of the regulator valve is set to 100%.

In this case, the supplied electric current I from the higher-level system varies in the range of 4 mA (the lower limit electric current value) through 20 mA (the higher limit electric current value), and thus the electric current required in the internal circuitry within the positioner is limited to no more than the 4 mA (for example, 3.8 mA) that can always be secured as an electric current value that is supplied from the higher-level system.

The valve opening setting value for the valve is inputted into the positioner by the higher-level system. Moreover, the actual opening value for the valve is obtained through the opening sensor. Consequently, the positioner is able to perform valve fault diagnostics, self-diagnostics, and the like, through performing calculations on the relationship between the valve opening setting value and the actual opening value for the valve. The provision of such fault diagnostic functions in the positioner makes it possible to increase the functionality of the system at a low cost, through eliminating the need for providing a separate fault diagnosing device (See, for example, Japanese Unexamined Patent Application Publication 2004-151941).

For reasons such as these, in recent years positioners have been provided with communication functions, self-diagnostic functions, valve diagnostic functions, valve opening output functions, and other additional functions, in addition to the primary function (the valve control function (the basic function)) of controlling the opening of the valve.

On the other hand, in order to improve control characteristics, there have been proposals for control methods wherein control outputs to the electro-pneumatic converting device are corrected through feeding back, as a minor loop, the air pressure outputted from the pilot relay, in addition to the conventional control loop based on the difference between the valve opening setting value and the actual opening value, as disclosed in Japanese Examined Patent Application Publication 2004-523016. Moreover, as disclosed in Japanese Unexamined Patent Application Publication 2001-221201, there have been proposals for control systems for correcting the control outputs to the electro-pneumatic converting device through feeding back, as a minor loop, the dislocation of the cylinder or poppet valve in the pilot relay, in addition to the conventional control loop based on the difference between the valve opening setting value and the actual setting value. This type of control method is known as double-loop control. Note that the control method that uses only the control loop based on the difference between the valve opening setting value and the actual opening value is known as single-loop control.

However, in a conventional positioner, the additional provision of a pressure sensor for detecting the output air pressure Po of the pilot relay, a location sensor for detecting the dislocation Xp of the cylinder or poppet valve in the pilot relay, and sensors for fault diagnostics (such as a pressure sensor for detecting the supply air pressure Ps to the electro-pneumatic converting device or pilot relay, a pressure sensor for detecting the output air pressure (nozzle back pressure) Pn from the electro-pneumatic converting device to the pilot relay, an oscillation detecting sensor for detecting the oscillation G1 within the positioner, and the like), in addition to the opening sensor for detecting the opening of the regulator valve, as the result of responding to improvements in controllability and multifunctionality, as described above, while substantially increasing the functionality when compared to before, causes the electric current required in order to exhibit all of these functions simultaneously to exceed the 3.8 mA limitation, thus increasing also the susceptibility to not being able to exhibit all functions with stability.

The present invention is to solve problems such as set forth above, and the object thereof is to provide a positioner that is able to exhibit high functionality reliably, while avoiding an inadequate electric current supply.

SUMMARY

The present invention, in order to solve this type of problem can be a positioner for receiving a supply of an electric current through a pair of electric wires from a higher-level system to generate its own operating power supply from the electric current that is supplied, and for controlling the degree of opening of a regulator valve in accordance with a value of the supplied electric current, including a control sensor for measuring a physical value used in controlling the degree of opening of the regulator valve; a non-control sensor for measuring a physical quantity used in other than controlling the degree of opening of the regulator valve; and power supply controlling means for defining the control sensor and the non-control sensor, excluding an opening sensor for detecting the degree of opening of the regulator valve, as sensors to which power may be supplied, for controlling whether or not power is supplied to each individual sensor to which power may be supplied, so that a plurality of sensors to which power may be supplied does not operate simultaneously, and for reading in, as power supply statuses, measured values from the sensors to which power may be supplied.

Sensors that are used for control of the degree of opening, for example, a pressure sensor for detecting the output air pressure Po of the pilot relay, a location sensor for detecting the dislocation Xp of the cylinder or poppet valve in the pilot relay, and the like are defined as control sensors, and sensors used for other than controlling the degree of opening, such as sensors for fault diagnostics (such as a pressure sensor for detecting the supply air pressure Ps to the electro-pneumatic converting device or pilot relay, a pressure sensor for detecting the output air pressure (nozzle back pressure) Pn from the electro-pneumatic converting device to the pilot relay, an oscillation detecting sensor for detecting the oscillation G1 within the positioner, and the like) are defined as non-control sensors. Moreover, the control sensors and the non-control sensors are defined as sensors to which power may be supplied, and while whether or not power is supplied to the individual sensors to which power may be supplied is controlled so that a plurality of these sensors that are supplied power will not operate simultaneously, a measurement value is read, as a power supply status, from the sensors to which power may be supplied. Doing so prevents a simultaneous power supply to a plurality of sensors to which power may be supplied, thereby controlling the electric current consumed.

Note that while of these various types of sensors that are provided within the positioner, those sensors used for controlling the degree of opening (the control sensors) must be operated with a short cycle time, those sensors that are used for other than controlling the degree of opening (the non-control sensors) need not the operated frequently, and operating with a relatively long cycle time is not problematic. Moreover, as illustrated in Japanese Unexamined Patent Application Publication 2010-140302 ("JP '302"), if there is a surplus of electric current in the electric current provided to the field device (positioner), it may be used in order to increase the capabilities of the field device by increasing the frequency of the operating clock of the CPU that is built into the field device, and there are also situations that one to believe that this means that there is a change in the control cycle time in the positioner, which ties also to the operating cycle time of the sensors used in control.

In consideration of such situations, in the examples of the present invention, consideration is given to setting the power supply cycle times for the individual sensors to which power may be supplied by defining a specific control sensor, from among the control sensors, as a reference sensor, and using the cycle time for the supply of power to the reference sensor as a reference. For example, one may consider defining, as the reference sensor, the pressure sensor that detects the output air pressure Po of the pilot relay, and having the cycle time for the supply of power to the sensor for the fault diagnostics be a longer cycle time than the cycle time for the supply of power for the reference sensor. Moreover, when the cycle time for the supply of power to the reference sensor is changed, the cycle time for the supply of power to each of the sensors to which power may be supplied may be adjusted automatically, based on the cycle time for the supply of power to the reference sensor, or the cycle times for the supply of power to each of the sensors to which power may be supplied may be set individually as mathematical functions of the cycle time for the supply of power to the reference sensor, and the cycle times for the supply of power to each of the individual sensors to which power may be supplied are changed automatically depending on the mathematical functions that have been set when the cycle time for the supply of power to the reference sensor is changed.

Moreover, in the present invention, the opening sensor for detecting the degree of opening of the regulator valve may also be included among the sensors to which power may be supplied. That is, while the opening sensor that detects the degree of opening of the regulator valve fulfills the most important role in the opening control, so normally is always in a state wherein the power is supplied, the opening sensor for detecting the degree of opening of the regulator valve may also be included among the sensors to which power may be supplied, and control of whether or not to supply power to each of the individual sensors to which power may be supplied may be performed so as to not operate simultaneously a plurality of sensors to which power may be supplied, including the opening sensor.

In the present invention, control of whether or not power is supplied to each individual sensor to which power may be supplied is performed so that a plurality of sensors to which power may be supplied does not operate simultaneously, and a measured value is read in from a sensor to which power may be supplied as a power supply status, thus making it possible to avoid inadequacies in the electric current that is supplied, through not supplying power simultaneously to a plurality of sensors to which power may be supplied, while make making it possible to exhibit high functionality reliably.

DETAILED DESCRIPTION

Examples according to the present invention are explained below in detail, based on the drawings.

Figure 1:
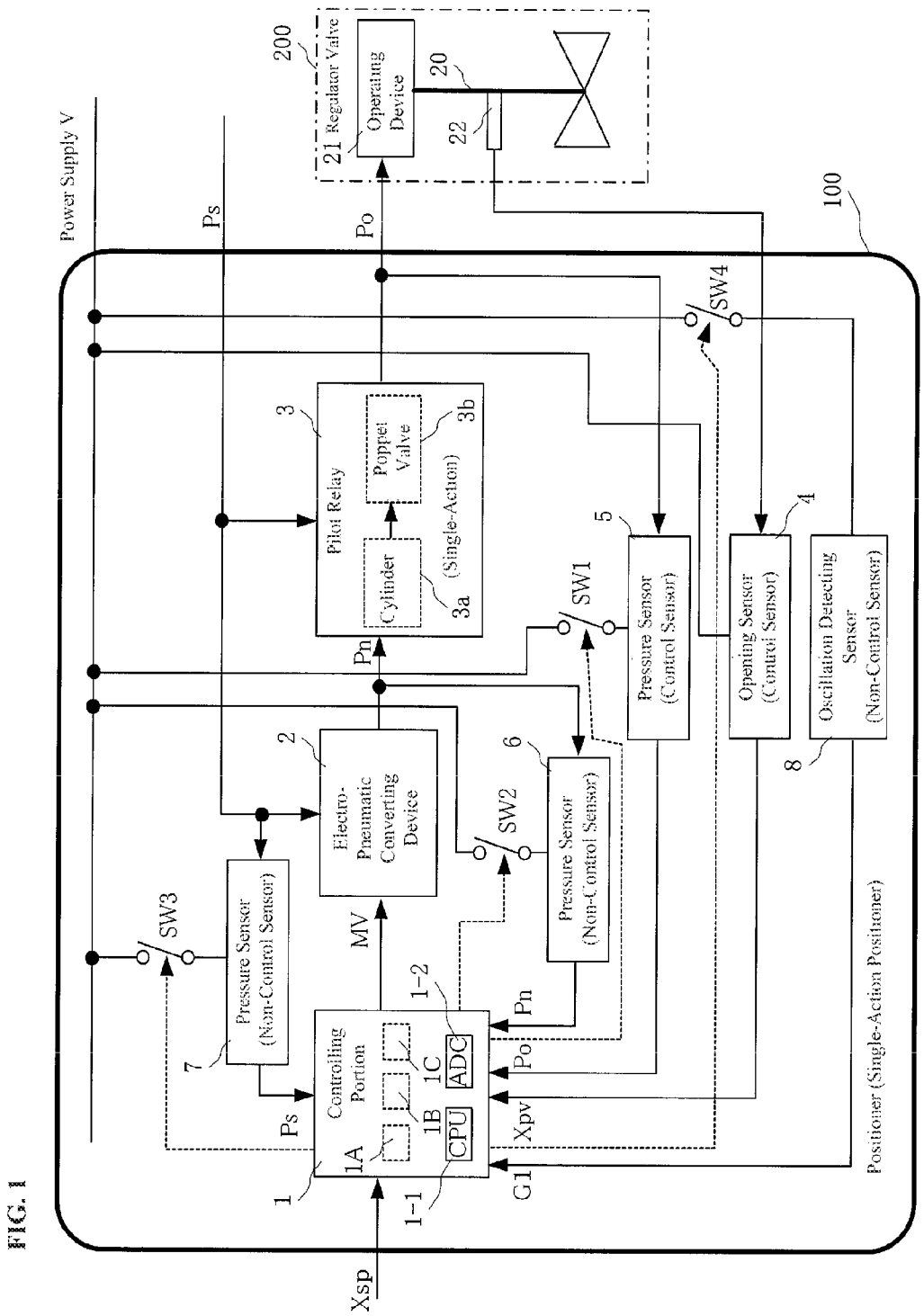
FIG. 1 is a block diagram illustrating an example of a positioner according to the present invention.

FIG. 1 is a block diagram illustrating a an example of a positioner according to the present invention. In this figure, 100 is a positioner and 200 is a regulator valve wherein the opening thereof is adjusted by the positioner 100. The regulator valve 200 has an operating device 21 that drives a valve rod 20, and a feedback mechanism 22 that feeds back the amount of dislocation in the upward or downward direction of the valve rod 20.

The positioner 100 includes a controlling portion 1 for calculating a difference between a valve opening setting value Xsp that is sent from a higher-level system and an actual opening value Xpv that is fed back from a regulator valve 200, to generate, as a control output MV, an electric signal in accordance with this difference; an electro-pneumatic converting device 2 for converting, into an air pressure signal (a nozzle back pressure) Pn, the control output MV generated by the controlling portion 1; a pilot relay 3 for amplifying the nozzle back pressure Pn, converted by the electro-pneumatic converting device 2, and for outputting it to the regulator valve 200 as an air pressure signal (an output air pressure) Po; an opening sensor 4; a first pressure sensor 5; a second pressure sensor 6; a third pressure sensor 7; and an oscillation detecting sensor 8.

Note that the pilot relay 3 is provided with a cylinder 3a and a poppet valve 3b. Moreover, the pilot relay 3 has just one air pressure output port, but causes the regulator valve 200 to operate in the forward direction (driven in the direction corresponding to the control output MV) or to operate in the reverse direction (driven in the direction opposite relative to the control output MV) through the air pressure Po that is outputted from this one output port. A pilot relay with this operating method is known as a single-action pilot relay, and a positioner that uses a single-action pilot relay is known as a single-action positioner.

Moreover, the opening sensor 4 detects the degree of opening of the regulator valve 200 from the amount of dislocation of the valve rod 20 fed back by the feedback mechanism 22, and sends the detected valve opening to the controlling portion 1 as the actual opening value Xpv. The first pressure sensor 5 detects the output air pressure Po to the regulator valve 200 from the pilot relay 3, and sends it to the controlling portion 1. The second pressure sensor 6 detects the nozzle back pressure Pn to the pilot relay 3 from the electro-pneumatic converting device 2, and sends it to the controlling portion 1. The third pressure sensor 7 detects the supply air pressure Ps to the electro-pneumatic converting device 2 and the pilot relay 3, and sends it to the controlling portion 1. The oscillation detecting sensor 8 detects the oscillation G1 within the positioner 100 and sends it to the controlling portion 1.

Moreover, the opening sensor 4, the first pressure sensor 5, the second pressure sensor 6, the third pressure sensor 7, and the oscillation detecting sensor 8 operate upon receiving a supply from the power supply V, where a switch SW1 is provided in the supply circuit for the power supply V to the first pressure sensor 5, a switch SW2 is provided in the supply circuit of the power supply V to the second pressure sensor 6, a switch SW3 is provided in the supply circuit of the power supply V to the third pressure sensor 7, and a switch SW4 is provided in the supply circuit of the power supply V to the oscillation detecting sensor 8.

Note that in the present example, no switch is provided in the supply circuit of the power supply V to the opening sensor 4, where the opening sensor 4 is always in a state wherein power is supplied, where the measured value from the opening sensor 4 is read in to the controlling portion 1 with the required timing. Moreover, an acceleration sensor is used as the oscillation detecting sensor 8.

The controlling portion 1 is embodied through hardware, having a processor and a storage device, and a program that achieves a variety of functions in cooperation with this hardware, and generates a control output MV.

A control output generating function (opening control function) 1A, a fault diagnostics function 1B for diagnostics of various types of faults within the positioner 100, and a power supply controlling function 1C for turning the switches SW1 through SW4 ON and OFF are provided. Note that the CPU (central calculation processing device) 1-1 and the ADC (A/D converter) 1-2, which are the critical structural elements of the controlling portion 1, are illustrated within the functional block of the controlling portion 1.

The controlling portion 1, through the control output generating function 1A, calculates a difference between the valve opening setting value Xsp from the higher-level system and the actual opening value Xpv from the opening sensor 4, to generate, as a control output, an electric signal in accordance with this difference. Moreover, the control output that has been generated is corrected by the air pressure Po outputted from the first pressure sensor 5, fed back as a minor loop, to be the control output MV to the electro-pneumatic converting device 2. In this case, the opening sensor 4 and the pressure sensor 5 are used in controlling the degree of opening. The opening sensor 4 and the pressure sensor 5 that are used in controlling the degree of opening correspond to the control sensor in the present invention.

Fault Diagnostics Function

The controlling portion performs diagnostics for various types of faults within the positioner 100 such as a clogged nozzle, a clogged fixed aperture, an aberrant vibration, or the like, based on the nozzle back pressure Pn from the second pressure sensor 6, the supply air pressure Ps from the third pressure sensor 7, and the oscillation G1 from the oscillation detecting sensor 8, through the fault diagnostics function 1B. In this case, the second pressure sensor 6, the third pressure sensor 7, and the oscillation detecting sensor 8 are used for other than controlling the degree of opening. These second pressure sensor 6, third pressure sensor 7, and oscillation detecting sensor 8 that are used for other than controlling the degree of opening correspond to the non-control sensors in this example of the present invention.

The controlling portion 1 controls the ON/OFF of the switch SW1 that is provided in the supply circuit of the power supply V to the first pressure sensor 5, the switch SW2 that is provided in the supply circuit of the power supply V to the second pressure sensor 6, the switch SW3 that is provided in the supply circuit of the power supply V to the third pressure sensor 7, and the switch SW4 that is provided in the supply circuit of the power supply V to the oscillation detecting sensor 8.

In this case the power supply controlling function 1C has the first pressure sensor 5, the second pressure sensor 6, the third pressure sensor 7, and the oscillation detecting sensor 8 as sensors to which power may be supplied, and performs control of whether or not power is supplied to each of the individual sensors to which power may be supplied, so that a plurality of the sensors to which power may be supplied does not operate simultaneously. Moreover, it reads in measurement values, as the power supply status, from the sensors to which power may be supplied, and passes the read-in measurement values to the control output generating function 1A and the fault diagnostics function 1B.

Figure 2:
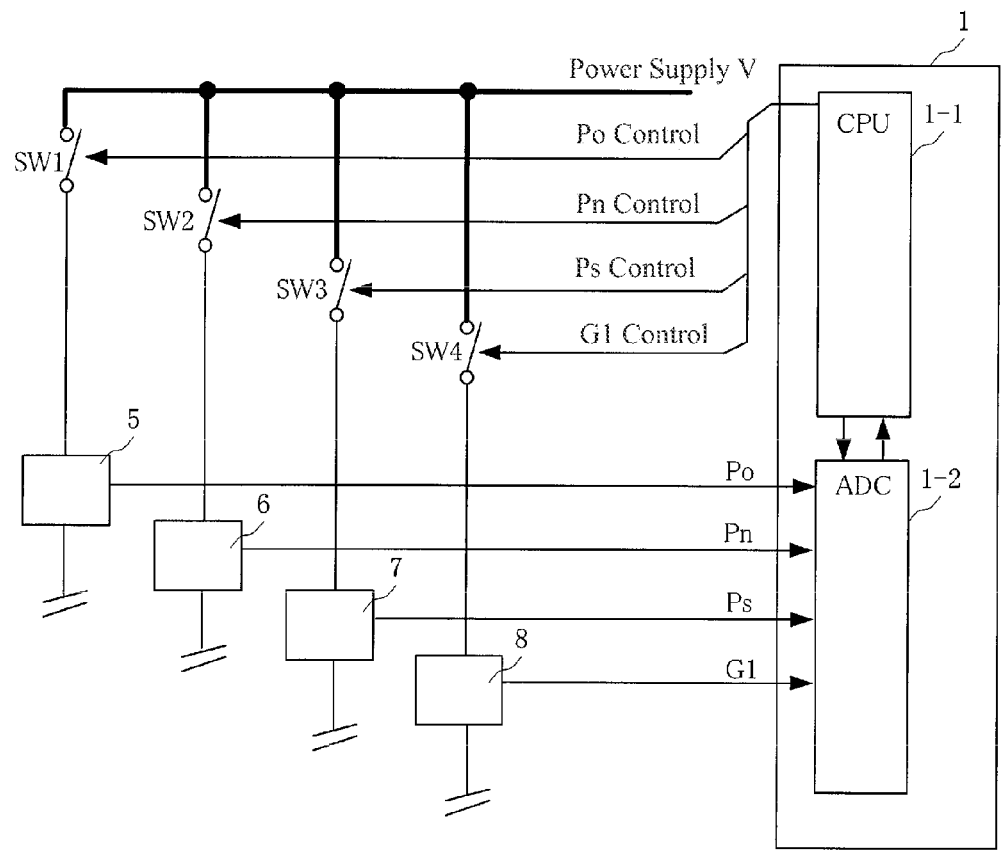
FIG. 2 is a diagram illustrating selected components pertaining to the power supply controlling function of a controlling portion of this positioner.
Figure 3:
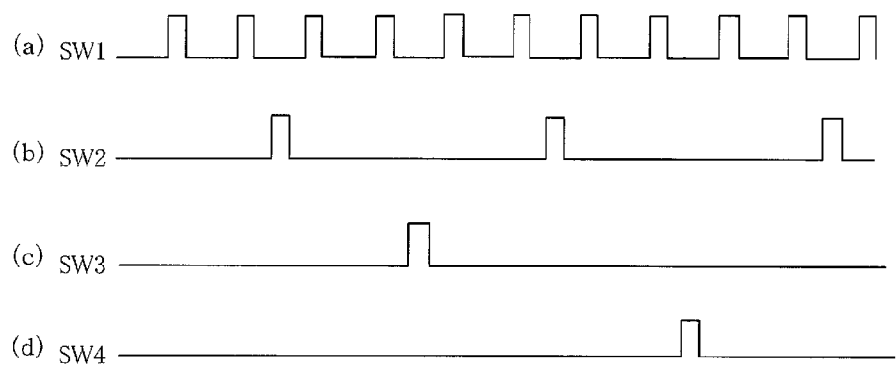
FIG. 3 is a timing chart illustrating the state of ON/OFF control of switches SW1 through SW4 through the power supply controlling function.

FIG. 2 shows extracted portions pertaining to the power supply controlling function 1C in FIG. 1. FIG. 3 illustrates a timing chart of the ON/OFF control statuses of the switches SW1 through SW4 by the power supply controlling function 1C. The power supply controlling function 1C is achieved through a combination of the CPU 1-1 and the ADC 1-2 in the controlling portion 1.

In this example, the CPU 1-1 turns the switch SW1 ON for a short cycle time (referencing FIG. 3 (a)), and turns the switches SW2, SW3, and SW4 ON for a longer cycle time than switch SW1, based on the ON cycle time for the switch SW1, so as to not overlap the ON statuses of switches SW1 through SW4 (referencing FIGS. 3 (b), (c), and (d)). As a result, power is supplied to the first pressure sensor 5, the second pressure sensor 6, the third pressure sensor 7, and the oscillation detecting sensor 8 with offsetted time bands so that a plurality thereof does not operate simultaneously, that is, so that no more than one of these is in operation.

Moreover, when the switch SW1 is ON, the CPU 1-1 reads in, through the ADC 1-2, the measured value Po from the pressure sensor 5, which is in a state wherein power is supplied through the switch SW1, and, when the switch SW2 is ON, reads in the measured value Pn through the ADC 1-2 from the pressure sensor 6 which is in a state wherein power is supplied through the switch SW2. Similarly, when the switch SW3 is ON, it reads in the measured value Ps through the ADC 1-2 from the pressure sensor 7 that is in a state wherein power is supplied through the switch SW3, and when the switch SW4 is ON, it reads in the measured value G1 through the ADC 1-2 from the oscillation detecting sensor 8 that is in a state wherein power is supplied through the switch SW4.

In this way, in the positioner 100 according to the present example whether or not power is supplied to the individual sensors to which power may be supplied (the first pressure sensor 5, the second pressure sensor 6, the third pressure sensor 7, and the oscillation detecting sensor 8) is controlled, and measured values are read in from the sensors to which power may be supplied when in a state wherein power is supplied, making it possible to control the amount of electric current consumed, in order to avoid inadequate supply of electric current, through not supplying power simultaneously to a plurality of the sensors to which power may be supplied, while being able to exhibit high functionality reliably.

The most important function of the positioner is that of controlling the degree of valve opening, and preferably the cycle time for the supply of power to the control sensors is set so as to be a shorter cycle time than the cycle time for the supply of power to the non-control sensors, in order to improve control characteristics. In the present example, the ON cycle time for the switch SW1 is used as a reference, and the switches SW2, SW3, and SW4 are turned ON with longer cycle times than that for the switch SW1, in a way so as to not overlap the ON states of the switches SW1 through SW4. That is, the cycle times for the supply of power to the second pressure sensor 6, the third pressure sensor 7, and the oscillation detecting sensor 8 are set to be long cycle times, in reference to the cycle time for the supply of power to the first pressure sensor 5. This ensures the operation of the first pressure sensor 5, as a control sensor, with the cycle time for the supply of power to the first pressure sensor 5 as a short cycle time.

Note that the power supply controlling function 1C is provided with a function for automatically changing the cycle times for the supply of power, where if the cycle time for the supply of power to the first pressure sensor 5 is changed, then the cycle times for the supply of power to the second pressure sensor 6, the third pressure sensor 7, and the oscillation detecting sensor 8 are changed automatically in reference to the cycle time for the supply of power to the first pressure sensor 5.

If there is a surplus in the electric current supplied to the positioner, then, as indicated in JP '302, the control characteristics may be improved by having a short cycle time for the cycle time for controlling the degree of valve opening; however it is possible to perform the supply of power simultaneously to a plurality of sensors to which power may be supplied, while maintaining as-is the cycle times for the supply of power to the individual sensors to which power may be supplied. The power supply controlling function 1C is provided with a function for changing automatically the cycle times for the supply of power, making it possible to avoid the risk of providing power simultaneously to a plurality of sensors to which power may be supplied, through performing automatically the changes in the cycle times for the supply of power.

Moreover, the cycle times for supplying power to the second pressure sensor 6, the third pressure sensor 7, and the oscillation detecting sensor 8 may be provided individually as mathematical functions of the cycle time for supplying power to the first pressure sensor 5, so that when there is a change in the cycle time for supplying power to the first pressure sensor 5 the cycle times for supplying power to the second pressure sensor 6, the third pressure sensor 7, and the oscillation detecting sensor 8 changes automatically in accordance with the mathematical functions that have been set. Doing this makes it possible to prevent with ease the simultaneous supply of power to a plurality of sensors to which power may be supplied, because the cycle times for supplying power to the individual sensors to which power may be supplied are changed concomitantly in accordance with the mathematical functions that have been set when there has been a change in the cycle time for controlling the degree of opening of the valves during the operation of the positioner.

Figure 4:
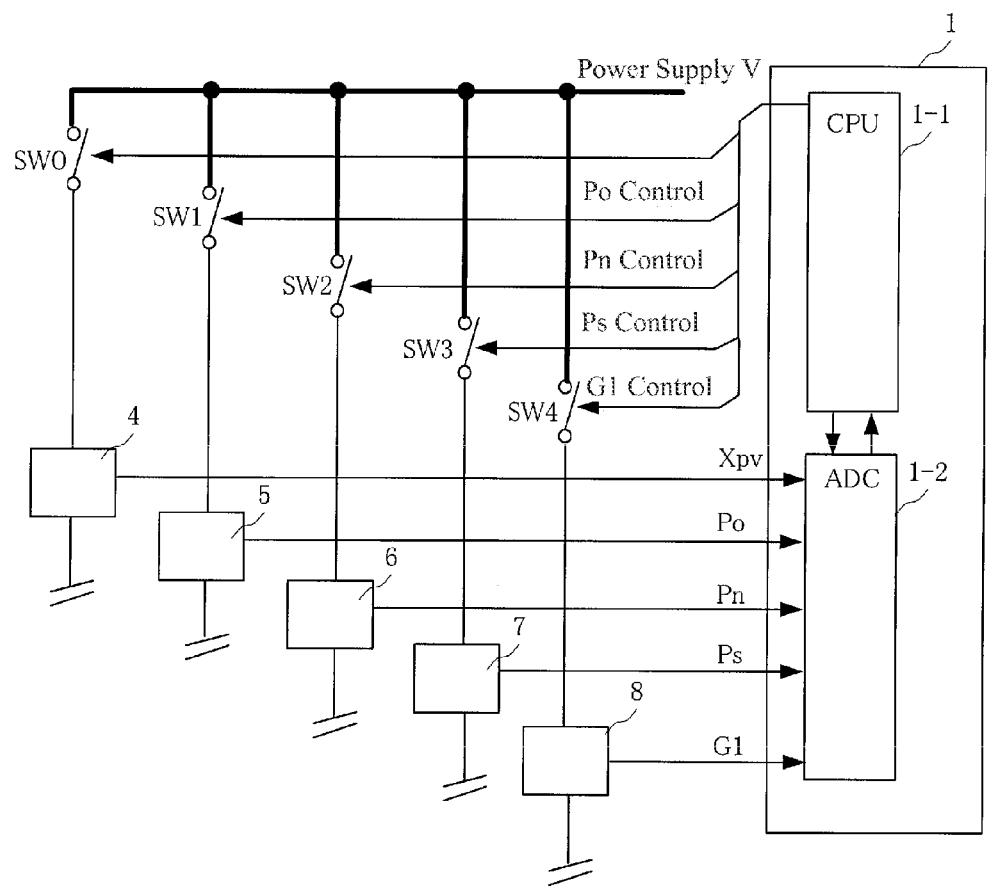
FIG. 4 is a diagram corresponding to FIG. 1 when an opening sensor is included in the sensor to which power is supplied.

Additionally, in the present example, no switch is provided in the supply circuit of the power supply V to the opening sensor 4, so the opening sensor 4 is always in a state wherein power is supplied; however, as illustrated in FIG. 4, a switch SW0 may be provided in the supply circuit of the power supply V to the opening sensor 4, and this switch SW0 may be turned ON/OFF by the power supply controlling function 1C.

Figure 5:
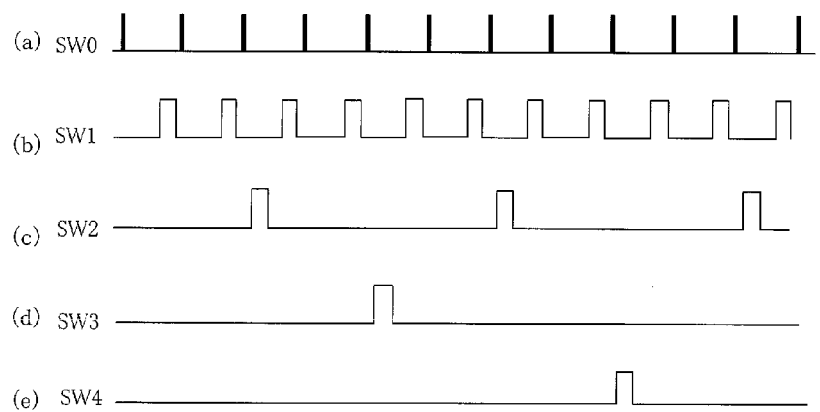
FIG. 5 is a timing chart corresponding to FIG. 3 when an opening sensor is included in the sensor to which power is supplied.

In this case, the switch SW0 is turned ON with a short cycle time (referencing FIG. 5 (a)), and the switch SW1 is turned ON with a short cycle time (the same cycle time as for switch SW0) (referencing FIG. 5 (b)), and the switches SW2, SW3, and SW4 are turned ON with long cycle times (referencing FIGS. 5 (c), (d), and (e)), in a manner such that the ON states of the switches SW0 through SW4 do not overlap, referencing the ON cycle time for the switch SW0. This supplies power to the opening sensor 4, the first pressure sensor 5, the second pressure sensor 6, the third pressure sensor 7, and the oscillation detecting sensor 8 in such a way that a plurality thereof does not operate simultaneously. Moreover, measurement values (Xpv, Po, Pn, Ps, and G1) are read out from the sensors to which power may be supplied, doing so each time power is supplied to the individual sensor to which power may be supplied (the opening sensor 4, the first pressure sensor 5, the second pressure sensor 6, the third pressure sensor 7, and the oscillation detecting sensor 8).

Figure 6:
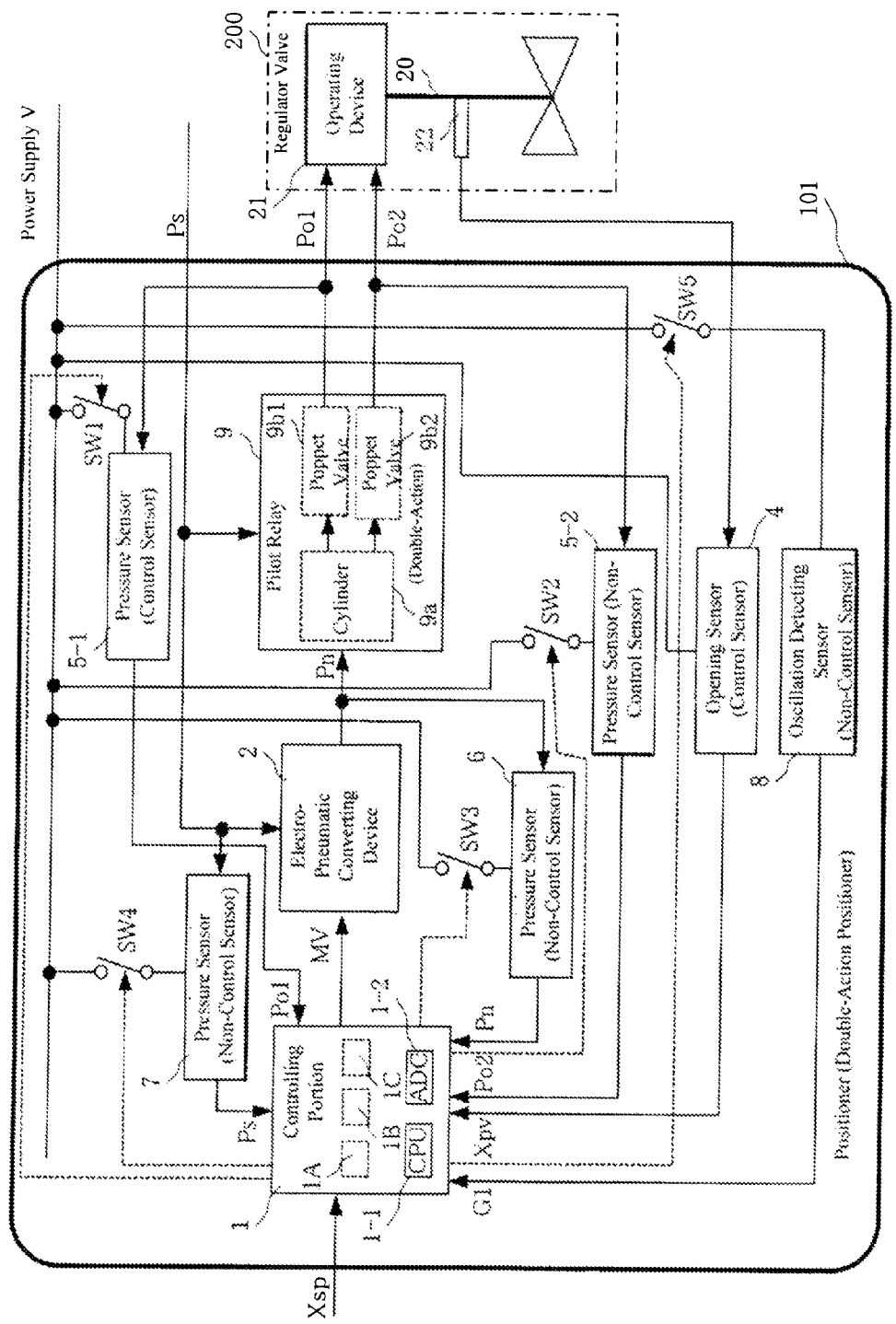
FIG. 6 is a block diagram illustrating another example of a positioner according to the present invention.

FIG. 6 is a block diagram illustrating another example of a positioner according to the present invention. In this example, a double-action pilot relay 9 is provided instead of the single-action pilot relay 3 in the structure in the above example. The double-action pilot relay 9 is provided with a cylinder 9a and poppet valves 9b1 and 9b2 as the primary structural elements thereof. Moreover, there are two air pressure output ports, where an air pressure Po1 is outputted from a first port and an air pressure Po2 is outputted from a second port.

In this positioner 101, when the regulator valve 200 is operating in the forward direction (is driven in the direction corresponding to the control output MV), the air pressure Po1 from the first port is higher than the air pressure Po2 from the second port, and when the regulator valve 200 is operating in the reverse direction (is driven in the direction opposite to that of the control output MV), the air pressure Po2 from the second port is higher than the air pressure Po1 from the first port. A positioner that uses this type of double-action pilot relay is known as a double-action positioner.

Moreover, in the positioner 101, an pressure sensor 5-1 for detecting the air pressure Po1 from the first output port of the pilot relay 9 and a pressure sensor 5-2 for detecting the air pressure Po2 from the second port of the pilot relay 9 are provided instead of the pressure sensor 5 in the structure in the above example. In this above example, the pressure sensor 5-1 will be referred to as the first pressure sensor, the pressure sensor 5-2 will be referred to as the second pressure sensor, the pressure sensor 6 will be referred to as the third pressure sensor, and the pressure sensor 7 will be referred to as the fourth pressure sensor.

Moreover, the opening sensor 4, the first pressure sensor 5-1, the second pressure sensor 5-2, the third pressure sensor 6, the fourth pressure sensor 7, and the oscillation detecting sensor 8 operate upon receiving a supply from the power supply V, where a switch SW1 is provided in the supply circuit for the power supply V to the first pressure sensor 5-1, a switch SW2 is provided in the supply circuit of the power supply V to the second pressure sensor 5-2, a switch SW3 is provided in the supply circuit of the power supply V to the third pressure sensor 6, a switch SW4 is provided in the supply circuit of the power supply V to the fourth treasure sensor 7, and a switch SW5 is provided in the supply circuit of the power supply V to the oscillation detecting sensor 8.

Note that no switch is provided in the supply circuit of the power supply V to the opening sensor 4 in the present example either, where the opening sensor 4 is always in a state wherein power is supplied, where the measured value from the opening sensor 4 is read in to the controlling portion 1 with the required timing.

As in the example, a controlling portion 1 is achieved through hardware including a processor and a storing portion, and a program that achieves the various functions working in cooperation with the hardware, provided with a control output generating function (the opening controlling function) 1A that generates the control output MV, a fault diagnostics function 1B for performing diagnostics of various types of faults within the positioner 100, and a power supply controlling function 1C for turning the switches SW1 through SW4 ON and OFF.

The controlling portion 1, through the control output generating function 1A, calculates a difference between the valve opening setting value Xsp from the higher-level system and the actual opening value Xpv from the opening sensor 4, to generate, as a control output, an electric signal in accordance with this difference. Moreover, the control output that has been generated is corrected by the air pressure Po1 and the air pressure Po2 outputted from the first pressure sensor 5-1, fed back as a minor loop, to be the control output MV to the electro-pneumatic converting device 2. In this case, the opening sensor 4 and the pressure sensor 5-1 are used in controlling the degree of opening. The opening sensor 4 and the pressure sensor 5-1 that are used in controlling the degree of opening correspond to the control sensor in the present invention.

The controlling portion performs diagnostics for various types of faults within the positioner 100 such as a fault in the air pressure outputted from the pilot relay, a clogged nozzle, a clogged fixed aperture, an aberrant vibration, or the like, based on the air pressure Po2 outputted from the second pressure sensor 5-2, the nozzle back pressure Pn from the third pressure sensor 6, the supply air pressure Ps from the fourth pressure sensor 7, and the oscillation G1 from the oscillation detecting sensor 8, through the fault diagnostics function 1B.

Note that the fault diagnostics function 1B performs diagnostics on faults in the air pressures outputted from the pilot relays through a comparison of the air pressure Po2 outputted from the second pressure sensor 5-2 and the air pressure Po1 outputted from the first pressure sensor 5-1, and from a ratio thereof. In this case, the second pressure sensor 5-2, the third pressure sensor 6, the fourth pressure sensor 7, and the oscillation detecting sensor 8 are used for other than controlling the degree of opening. These second pressure sensor 5-2, third pressure sensor 6, fourth pressure sensor 7, and oscillation detecting sensor 8 that are used for other than controlling the degree of opening correspond to the non-control sensors in the present examples.

The controlling portion 1 controls the ON/OFF of the switch SW1 that is provided in the supply circuit of the power supply V to the first pressure sensor 5-1, the switch SW2 that is provided in the supply circuit of the power supply V to the second pressure sensor 5-2, the switch SW3 that is provided in the supply circuit of the power supply V to the third pressure sensor 6, the switch SW4 that is provided in the supply circuit of the power supply V to the fourth pressure sensor 7, and the switch SW5 that is provided in the supply circuit of the power supply V to the oscillation detecting sensor 8.

In this case the power supply controlling function 1C has the first pressure sensor 5-1, the second pressure sensor 5-2, the third pressure sensor 6, the fourth pressure sensor 7, and the oscillation detecting sensor 8 as sensors to which power may be supplied, and performs control of whether or not power is supplied to each of the individual sensors to which power may be supplied, so that a plurality of the sensors to which power may be supplied does not operate simultaneously. Moreover, it reads in measurement values, as the power supply status, from the sensors to which power may be supplied, and passes the read-in measurement values to the control output generating function 1A and the fault diagnostics function 1B.

Figure 7:
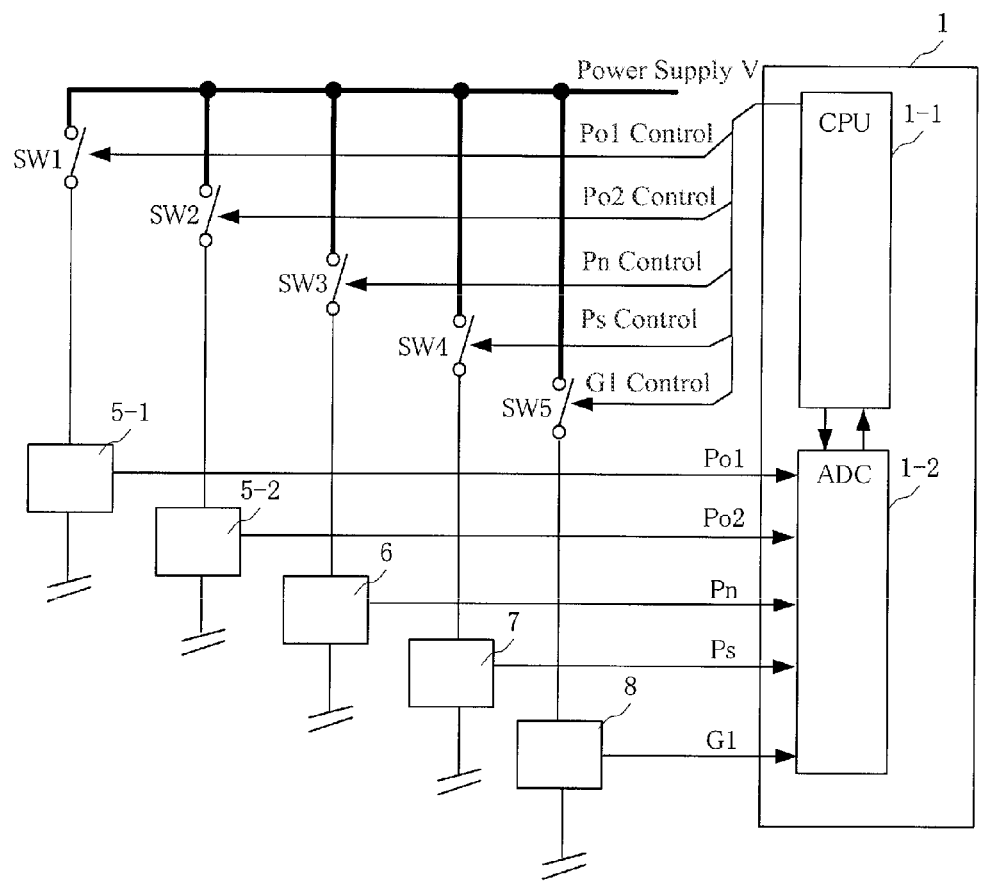
FIG. 7 is a diagram illustrating selected components pertaining to the power supply controlling function of a controlling portion of this positioner.
Figure 8:
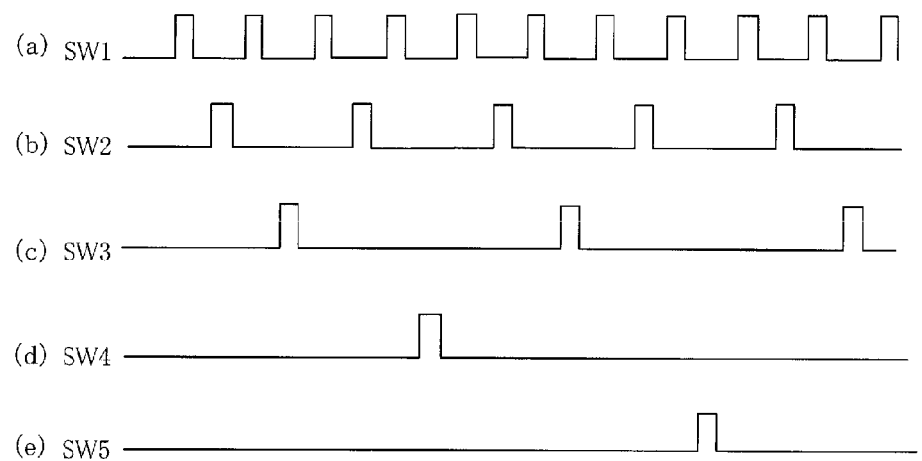
FIG. 8 is a timing chart illustrating the state of ON/OFF control of switches SW1 through SW5 through the power supply controlling function.

FIG. 7 shows extracted portions pertaining to the power supply controlling function 1C in FIG. 6. FIG. 8 illustrates a timing chart of the ON/OFF control statuses of the switches SW1 through SW5 by the power supply controlling function 1C. The power supply controlling function 1C is achieved through a combination of the CPU 1-1 and the ADC 1-2 in the controlling portion 1.

In this example, the CPU turns the switch SW1 ON for a short cycle time (referencing FIG. 8 (a)), and turns the switches SW2, SW3, SW4, and SW5 ON for a longer cycle time than switch SW1, based on the ON cycle time for the switch SW1, so as to not overlap the ON statuses of switches SW1 through SW5 (referencing FIGS. 8 (b), (c), (d), and (e)). As a result, power is supplied to the first pressure sensor 5-1, the second pressure sensor 5-2, the third pressure sensor 6, the fourth pressure sensor 7, and the oscillation detecting sensor 8 with offsetted time bands so that a plurality thereof does not operate simultaneously, that is, so that no more than one of these is in operation.

Moreover, when the switch SW1 is ON, the CPU 1-1 reads in, through the ADC 1-2, the measured value Po1 from the pressure sensor 5-1, which is in a state wherein power is supplied through the switch SW1, and, when the switch SW2 is ON, reads in the measured value Po2 through the ADC 1-2 from the pressure sensor which is in a state wherein power is supplied through the switch SW2. Similarly, when the switch SW3 is ON, it reads in the measured value Pn through the ADC 1-2 from the pressure sensor 6 that is in a state wherein power is supplied through the switch SW3, when the switch SW4 is ON, it reads in the measured value Ps through the ADC 1-2 from the pressure sensor 7 that is in a state wherein power is supplied through the switch SW4, and when the switch SW5 is ON, it reads in the measured value G1 through the ADC 1-2 from the oscillation detecting sensor 8 that is in a state wherein power is supplied through the switch SW5.

In this way, in the positioner 101 according to the present example, whether or not power is supplied to the individual sensors to which power may be supplied (the first pressure sensor 5-1, the second pressure sensor 5-2, the third pressure sensor 6, the fourth pressure sensor 7, and the oscillation detecting sensor 8) is controlled, and measured values are read in from the sensors to which power may be supplied when in a state wherein power is supplied, making it possible to control the amount of electric current consumed, in order to avoid inadequate supply of electric current, through not supplying power simultaneously to a plurality of the sensors to which power may be supplied, while being able to exhibit high functionality reliably.

The most important function of the positioner is that of controlling the degree of valve opening, and preferably the cycle time for the supply of power to the control sensors is set so as to be a shorter cycle time than the cycle time for the supply of power to the non-control sensors, in order to improve control characteristics. In the present form of embodiment, the ON cycle time for the switch SW1 is used as a reference, and the switches SW2, SW3, SW4, and SW5 are turned ON with longer cycle times than that for the switch SW1, in a way so as to not overlap the ON states of the switches SW1 through SW5. That is, the cycle times for the supply of power to the second pressure sensor 5-2, the third pressure sensor 6, the fourth pressure sensor 7, and the oscillation detecting sensor 8 are set to be long cycle times, in reference to the cycle time for the supply of power to the first pressure sensor 5-1. This ensures the operation of the first pressure sensor 5-1, as a control sensor, with the cycle time for the supply of power to the first pressure sensor 5-1 as a short cycle time.

Note that the power supply controlling function 1C is provided with a function for automatically changing the cycle times for the supply of power, where if the cycle time for the supply of power to the first pressure sensor 5-1 is changed, then the cycle times for the supply of power to the second pressure sensor 5-2, the third pressure sensor 6, the fourth pressure sensor 7, and the oscillation detecting sensor 8 are changed automatically in reference to the cycle time for the supply of power to the first pressure sensor 5-1.

If there is a surplus in the electric current supplied to the positioner, then, as indicated in JP '302, the control characteristics may be improved by having a short cycle time for the cycle time for controlling the degree of valve opening; however it is possible to perform the supply of power simultaneously to a plurality of sensors to which power may be supplied, while maintaining as-is the cycle times for the supply of power to the individual sensors to which power may be supplied. The power supply controlling function 1C is provided with a function for changing automatically the cycle times for the supply of power, making it possible to avoid the risk of providing power simultaneously to a plurality of sensors to which power may be supplied, through performing automatically the changes in the cycle times for the supply of power.

Moreover, the cycle times for supplying power to the second pressure sensor 5-2, the third pressure sensor 6, the fourth pressure sensor 7, and the oscillation detecting sensor 8 may be provided individually as mathematical functions of the cycle time for supplying power to the first pressure sensor 5-1, so that when there is a change in the cycle time for supplying power to the first pressure sensor 5-1, the cycle times for supplying power to the second pressure sensor 5-2, the third pressure sensor 6, the fourth pressure sensor 7, and the oscillation detecting sensor 8 will change automatically in accordance with the mathematical functions that have been set. Doing this makes it possible to prevent with ease the simultaneous supply of power to a plurality of sensors to which power may be supplied, because the cycle times for supplying power to the individual sensors to which power may be supplied are changed concomitantly in accordance with the mathematical functions that have been set when there has been a change in the cycle time for controlling the degree of opening of the valves during the operation of the positioner.

Figure 9:
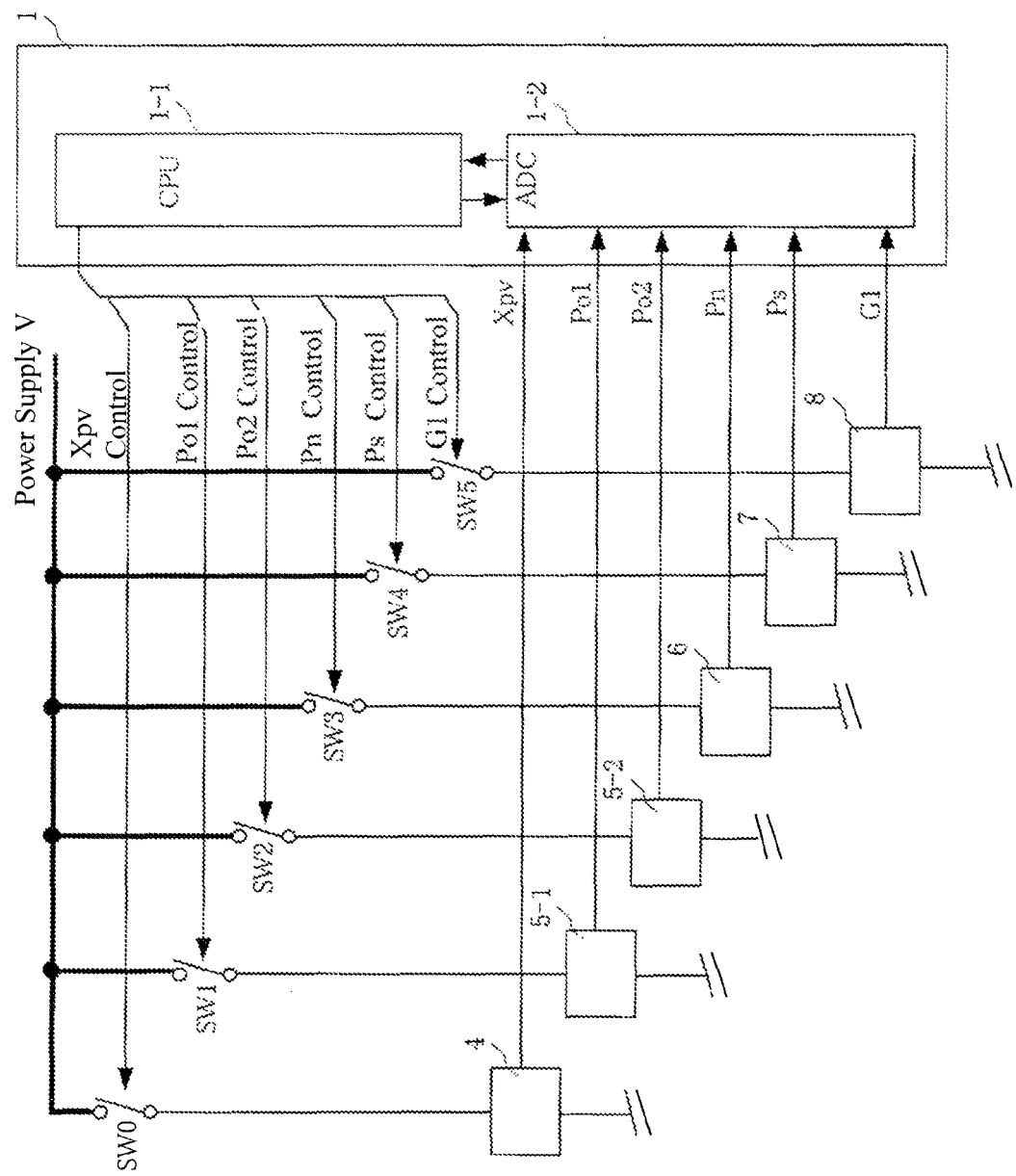
FIG. 9 is a diagram corresponding to FIG. 7 when an opening sensor is included in the sensor to which power is supplied.

Additionally, in the present example, no switch is provided in the supply circuit of the power supply V to the opening sensor 4, so the opening sensor 4 is always in a state wherein power is supplied; however, as illustrated in FIG. 9, a switch SW0 may be provided in the supply circuit of the power supply V to the opening sensor 4, and this switch SW0 may be turned ON/OFF.

Figure 10:
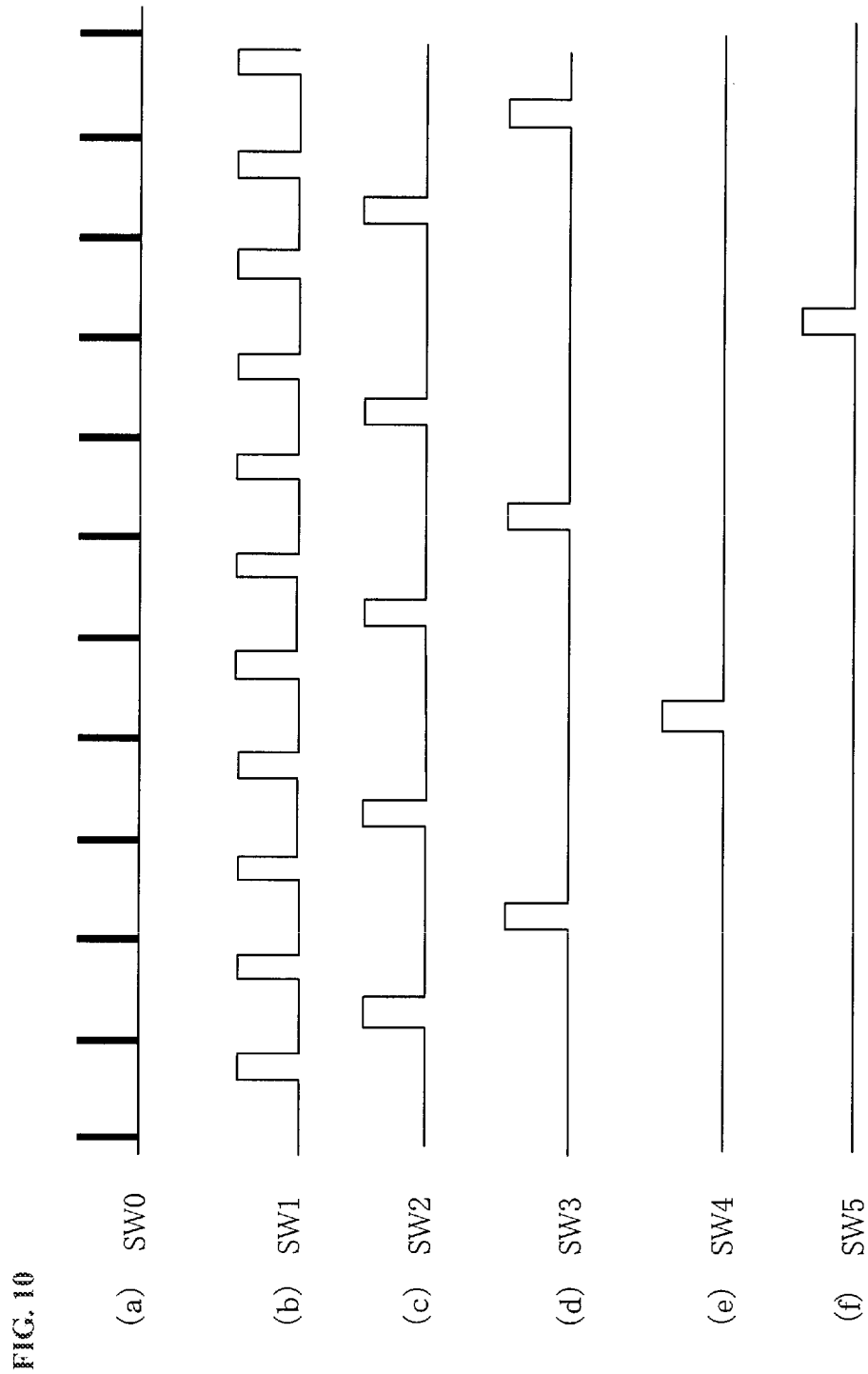
FIG. 10 is a timing chart corresponding to FIG. 8 when an opening sensor is included in the sensor to which power is supplied.

In this case, the switch SW0 is turned ON with a short cycle time (referencing FIG. 10 (a)), and the switch SW1 is turned ON with a short cycle time (the same cycle time as for switch SW0) (referencing FIG. 10 (b)), and the switches SW2, SW3, SW4, and SW5 are turned ON with long cycle times (referencing FIGS. 10 (c), (d), (e), and (f)), in a manner such that the ON states of the switches SW0 through SW5 do not overlap, referencing the ON cycle time for the switch SW0. This supplies power to the opening sensor 4, the first pressure sensor 5-1, the second pressure sensor 5-2, the third pressure sensor 6, the fourth pressure sensor 7, and the oscillation detecting sensor 8 in such a way that a plurality thereof does not operate simultaneously. Moreover, measurement values (Xpv, Po1, Po2, Pn, Ps, and G1) are read out from the sensors to which power may be supplied, doing so each time power is supplied to the individual sensor to which power may be supplied (the opening sensor 4, the first pressure sensor 5-1, the second pressure sensor 5-2, the third pressure sensor 6, the fourth pressure sensor 7, and the oscillation detecting sensor 8).

Figure 11:
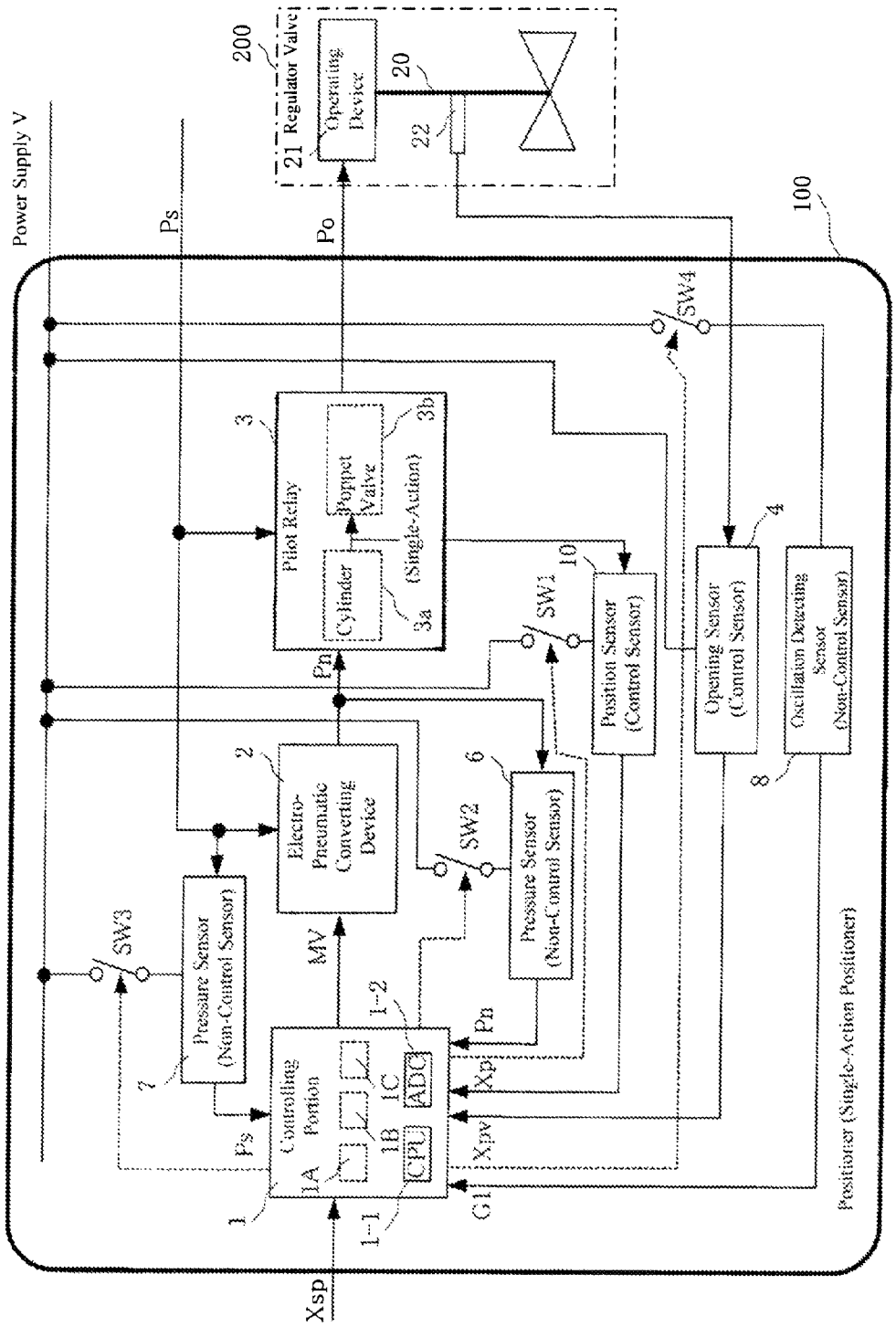
FIG. 11 is a diagram illustrating an example wherein, in the previous examples, the dislocation of the cylinder and poppet valve are fed back to the controlling portion as a minor loop.

In the example set forth above, a first pressure sensor 5 was provided and the air pressure Po outputted from the pilot relay 3 was fed back to the controlling portion 1 as a minor loop, but, as illustrated in FIG. 11, a position sensor 10 may be provided instead of the first pressure sensor 5, and the dislocation of the cylinder 3a or the poppet valve 3b in the pilot relay 3 may instead be fed back to the controlling portion 1. In this case, the opening sensor 4 and the position sensor 10 are used in the control of the degree of opening, so the opening sensor 4 and the position sensor 10 correspond to the control sensor in the present invention. The same can be said in the second form of embodiment as well.

While in the above example the switches SW1, SW2, SW3, and SW4 were provided in the supply circuits for the power supply V to the first pressure sensor 5, the second pressure sensor 6, the third pressure sensor 7, and the oscillation detecting sensor 8, it is possible to control whether or not power is supplied to the sensor elements by, for example, operating ON/OFF control functions that are added to the first pressure sensor 5, the second pressure sensor 6, the third pressure sensor 7, and the oscillation detecting sensor 8. The same can be said in the second form of embodiment as well.

Figure 12:
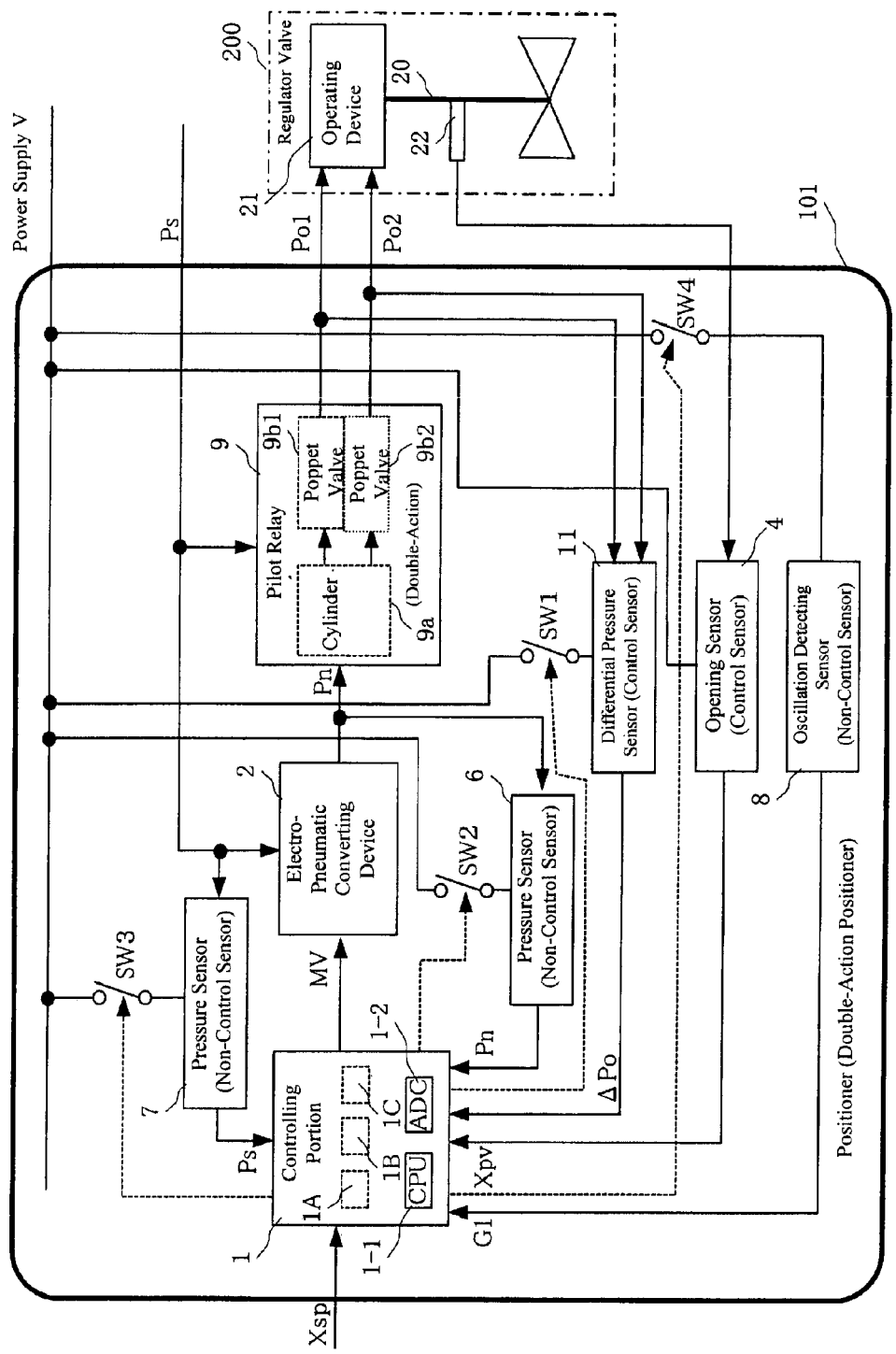
FIG. 12 is a diagram illustrating an example wherein, in the above examples, the differential pressure between the output air pressure from the first output port and the output air pressure from the second output port is fed back to the controlling portion as a minor loop.

In the other example, the air pressures Po1 and Po2 outputted from the pilot relay 9, were detected by the pressure sensors 5-1 and 5-2; however, as illustrated in FIG. 12, a differential pressure sensor 11 may be provided instead of the pressure sensors 5-1 and 5-2, and the differential pressure ΔPo between the outputted air pressures Po1 and Po2, detected by the differential pressure sensor 11, may be fed back to the controlling portion 1 as the minor loop. In this case, the opening sensor 4 and the differential pressure sensor 11 are used in the control of the degree of opening, so the opening sensor 4 and the differential pressure sensor 11 correspond to the control sensor in the present invention.

In the above examples the pressure sensors 5, 5-1, 5-2, 6, and 7, and the oscillation detecting sensor 8 were the sensors to which power may be provided; however, if a temperature sensor, humidity sensor, or the like, were provided within the positioner, such sensors would also be included as sensors to which power may be provided, and whether or not power is supplied thereto may be controlled in the same manner as described above.

The positioner according to the present invention can be used in a variety of fields, such as process control, for controlling the opening of a regulator valve.

The invention claimed is:

1. A positioner receiving a supply of an electric current through a pair of electric wires from a higher-level system to generate its own operating power supply from the electric current that is supplied, and controlling a degree of opening of a regulator valve in accordance with a value of the supplied electric current, the positioner comprising:
   at least one control sensor measuring a physical quantity used in controlling the degree of opening of the regulator valve;
   at least one non-control sensor measuring a physical quantity used in other than controlling the degree of opening of the regulator valve;
   a power supply controller controlling the at least one control sensor and the at least one non-control sensor as sensors to which power may be supplied, excluding an opening sensor detecting the degree of opening of the regulator valve, the power supply controller controlling whether or not power is supplied to each individual sensor to which power may be supplied, so that a plurality of sensors to which power may be supplied do not operate simultaneously, and reading in, as power supply statuses, measured values from the sensors to which power may be supplied, wherein:
   the at least one control sensor and the at least one non-control sensor include a specific control sensor as a reference sensor;
   a cycle time for the supply of power to each individual sensor to which power may be supplied is set based on the cycle time for the supply of power to the reference sensor; and
   the cycle time for the supply of power to each individual sensor is set individually for each as a function of the cycle time for the supply of power to the reference sensor.

2. The positioner as set forth in claim 1, wherein:
   the power supply controller adjusts the cycle time for the supply of power to each individual sensor to which power may be supplied, in reference to the cycle time for the supply of power to the reference sensor, when there has been a change in the cycle time for the supply of power to the reference sensor.

3. A positioner receiving a supply of an electric current through a pair of electric wires from a higher-level system to generate its own operating power supply from the electric current that is supplied, and controlling a degree of opening of a regulator valve in accordance with a value of the supplied electric current, the positioner comprising:
   at least one control sensor measuring a physical quantity used in controlling the degree of opening of the regulator valve;
   at least one non-control sensor measuring a physical quantity used in other than controlling the degree of opening of the regulator valve;
   a power supply controller controlling the at least one control sensor and the at least one non-control sensor, including an opening sensor detecting the degree of opening of the regulator valve, as sensors to which power may be supplied, the power supply controller controlling whether or not power is supplied to each individual sensor to which power may be supplied, so that a plurality of sensors to which power may be supplied do not operate simultaneously, and reading in, as power supply statuses, measured values from the sensors to which power may be supplied; wherein:
   the at least one control sensor and the at least one non-control sensor include a specific control sensor as a reference sensor;
   a cycle time for the supply of power to each individual sensor to which power may be supplied is set based on the cycle time for the supply of power to the reference sensor; and
   the cycle time for the supply of power to each individual sensor is set individually for each as a function of the cycle time for the supply of power to the reference sensor.

* * * * *